(12) United States Patent
Gillet et al.

(10) Patent No.: US 6,739,435 B2
(45) Date of Patent: May 25, 2004

(54) DEVICE FOR LOCKING/UNLOCKING THE MOVEMENT OF A NOTCHED MEMBER

(75) Inventors: Pascal Gillet, Sarcey (FR); Laurent Melin, Nogent (FR)

(73) Assignee: Gillet Outillage, Nogent (FR)

( * ) Notice: Subject to any disclaimer, the term of this patent is extended or adjusted under 35 U.S.C. 154(b) by 19 days.

(21) Appl. No.: 10/169,913

(22) PCT Filed: Jan. 11, 2001

(86) PCT No.: PCT/FR01/00082

§ 371 (c)(1),
(2), (4) Date: Nov. 8, 2002

(87) PCT Pub. No.: WO01/52013

PCT Pub. Date: Jul. 19, 2001

(65) Prior Publication Data

US 2003/0121344 A1 Jul. 3, 2003

(30) Foreign Application Priority Data

Jan. 11, 2000 (FR) .............................................. 0000911

(51) Int. Cl.$^7$ .............................................. F16D 63/00
(52) U.S. Cl. ........................................... 188/68; 74/529
(58) Field of Search .............................. 188/67, 68, 69, 188/19, 20, 30, 82.1, 84, 83, 82.84, 4 B; 74/29–32, 34, 529, 530, 533, 534, 536; 242/422.4, 156

(56) References Cited

U.S. PATENT DOCUMENTS

| 1,798,808 | A | * | 3/1931 | Potter | .......................... 188/31 |
|---|---|---|---|---|---|
| 2,771,782 | A | * | 11/1956 | Darby | ............................. 74/32 |
| 3,992,956 | A | * | 11/1976 | Fischer | ............................. 74/29 |
| 4,660,881 | A | * | 4/1987 | Komeya et al. | ........... 296/37.9 |
| 5,984,334 | A | * | 11/1999 | Dugas | ..................... 280/250.1 |

FOREIGN PATENT DOCUMENTS

| DE | 297 14 265 | 10/1997 |
|---|---|---|
| EP | 0 771 971 | 5/1997 |
| EP | 0 994 281 | 4/2000 |

* cited by examiner

*Primary Examiner*—Jack Lavinder
*Assistant Examiner*—Xuan Lan Nguyen
(74) *Attorney, Agent, or Firm*—Young & Thompson

(57) ABSTRACT

A device for locking/unlocking the movement of a notched member, comprising a toothed wheel, having a coaxial bore and whereof the teeth have a pitch equal to that of the member, and a fixed shaft about which is mounted the toothed wheel, the shaft has a diameter less than that of the bore of the wheel such that, subsequent to a radial clearance, the wheel is capable of moving between a centered unlocking position wherein the tops of the teeth of the notched member closest to the wheel, are located outside the pitch circle P of the wheel and the member can then move freely, and an off-center locking position, when the member exerts on the wheel a force F directed towards the axis of the shaft, position wherein the top of the tooth of the member is located, between two teeth of the wheel, inside the pitch circle P, so that the member and the wheel are mutually locked.

4 Claims, 2 Drawing Sheets

DEVICE FOR LOCKING/UNLOCKING THE MOVEMENT OF A NOTCHED MEMBER

BACKGROUND OF THE INVENTION

The present invention relates to a device for locking/unlocking the movement of a mobile notched member such as a notched bar mobile in translation or a pinion mobile in rotation.

It is known to effect control of locking and unlocking of a rack or of a pinion by means of a pawl which is constituted by an articulated lever urged by a spring and which bears, at its end, a hook engaging in the troughs between the teeth of a rack or of a pinion. Such a locking/unlocking device presents the drawback of requiring the use of a spring for return of the pawl, which spring is often a cause of breakdown further to breakage or corrosion.

SUMMARY OF THE INVENTION

The present invention essentially aims at overcoming this drawback by providing a locking/unlocking device having no return spring and being of particularly simple design.

To that end, this device for locking/unlocking the movement of a mobile notched member, particularly a notched bar mobile in translation or a pinion mobile in rotation, is noteworthy in that it comprises a toothed wheel in mesh, in a zone of contact, with the notches of the mobile member, having a coaxial bore and of which the teeth have a pitch equal to that of the teeth of the mobile member, and a fixed support shaft about which the toothed wheel is mounted to rotate, this fixed support shaft having an outer diameter smaller than the inner diameter of the bore of the wheel such that, subsequent to the radial clearance thus formed, the wheel may move radially between a substantially centered position of unlocking in which the tops of the teeth of the notched mobile member which are the closest to the wheel, are located outside the pitch circle of the teeth of the wheel and the notched mobile member may in that case move freely, and an off-centre position of locking, when the notched mobile member exerts on the toothed wheel a force directed towards the axis of the fixed support shaft, position in which the top of a tooth of the notched mobile member is located, between two teeth of the toothed wheel, within the pitch circle of the teeth of the wheel, such that the notched mobile member and the toothed wheel are locked mutually.

BRIEF DESCRIPTION OF THE DRAWINGS

A form of embodiment of the present invention will be described hereinafter, by way of non-limiting example, with reference to the accompanying drawings, in which.

DETAILED DESCRIPTION OF THE PREFERRED EMBODIMENTS.

Figure 1:
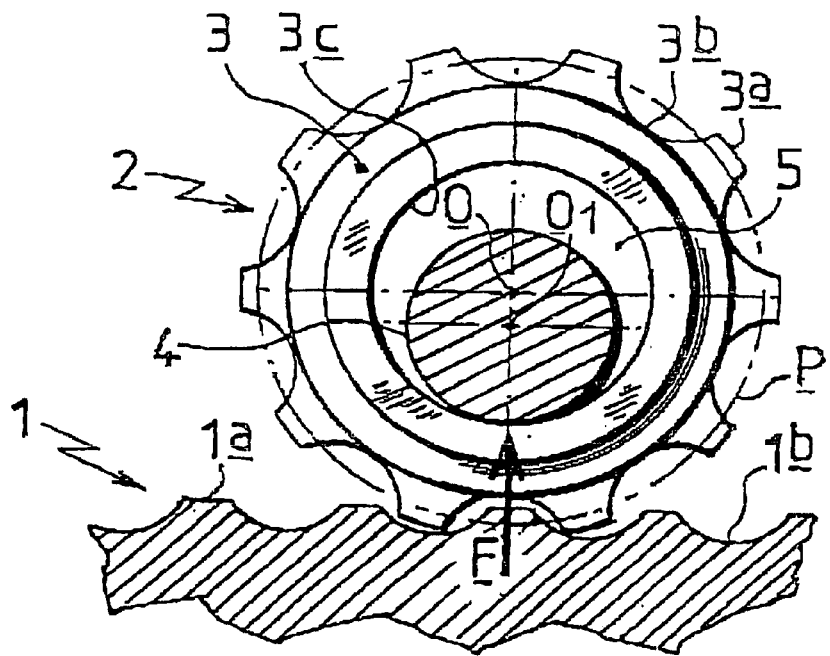
FIG. 1 is a view in transverse section of a locking/unlocking device according to the invention, in off-centre position of locking.
Figure 2:
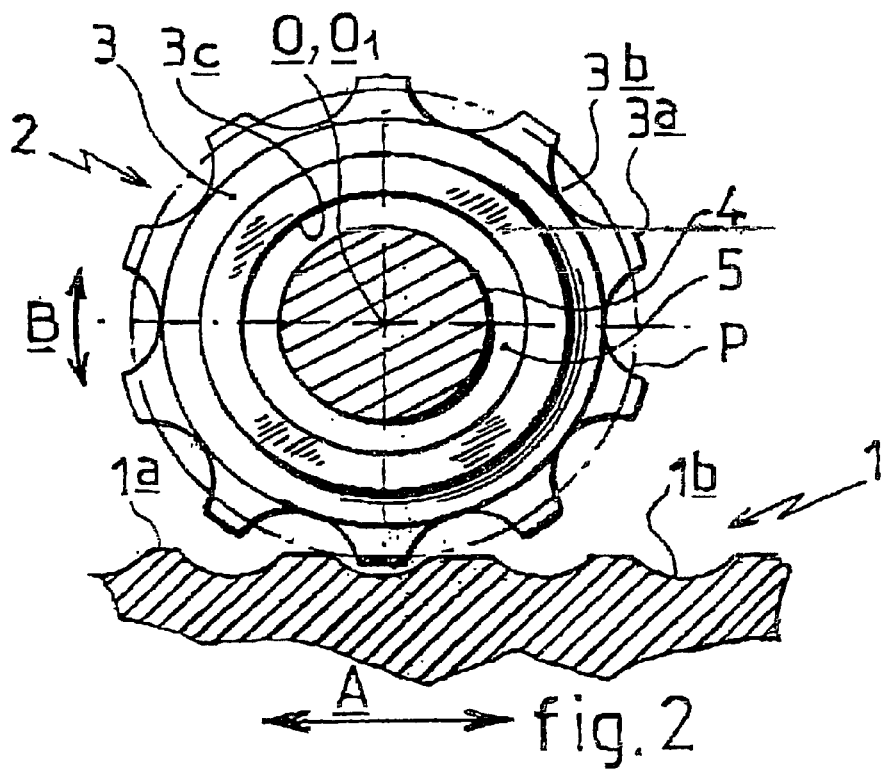
FIG. 2 is a view in transverse section of the device shown in FIG. 1, in centered position of unlocking.

The locking/unlocking device according to the invention which is shown in FIGS. 1 and 2 is associated with a notched bar 1 capable of being displaced in translation in the direction of arrow A (FIG. 2). This bar presents, on its upper face, a regular alternance of teeth 1a separated by notches 1b. The locking/unlocking device comprises a toothed wheel 2 located above the notched bar 1 and coplanar therewith, of axis O perpendicular to the direction of displacement A of the notched bar 1. The wheel 2 comprises a toothed ring 3 presenting on its periphery a regular alternance of teeth 3a separated by thoughts 3b. The pitch of the teeth 3a of the toothed ring 3 is equal to the pitch of the teeth 1a of the notched bar 1 and the teeth 3a of the toothed ring 3 are in mesh, in the lower part of the ring 3, with the teeth of the notched bar 1, as is apparent in FIGS. 1 and 2. The toothed ring 3 presents a coaxial bore 3c which is traversed by a fixed support shaft 4 of axis $O_1$ parallel to axis O, i.e. perpendicular to the direction of displacement A of the notched bar 1. The fixed support shaft 4 has a diameter smaller than that of the bore 3c of the toothed wheel 3 with the result that a radial clearance 5 exists between the inner surface of the bore 3c and the outer surface of the fixed support shaft 4, this clearance being able to be left free or filled with an element of elastic material as will be specified hereinbelow. Consequently, the toothed ring 3 may move transversely with respect to the central fixed support shaft 4, over a short distance. The pitch circle of the teeth 3a of the toothed ring 3 has also been shown in FIGS. 1 and 2 in dashed and dotted lines.

The functioning of the locking/unlocking device shown in FIGS. 1 and 2 will now be explained. In FIG. 1, the device is in position of locking in which the toothed ring 3 is off-centre with respect to the fixed support shaft 4. In that case, the notched bar 1 has been subjected to an upwardly directed force F, i.e. towards axis $O_1$ of the support shaft 4, so that this notched bar 1 has been displaced into upper position and it exerts a pressure on the toothed wheel 3. Subsequent to this pressure, the toothed ring 3 is pushed upwardly and the inner surface of its bore 3c is applied against the lower generatrix of the fixed support shaft 4 to which it is tangential. In this position, the axis O the toothed wheel 2 lies at a short distance above the axis $O_1$ of the fixed support shaft 4. Due to the upward displacement of the notched bar 1 and of the toothed ring 3 until this ring 3 is in abutment on the fixed support shaft 4, the top of the tooth 1a of the notched bar 1 which is engaged in the lower hollow 3b of the toothed ring 3, lies within the pitch circle P of the teeth 3a, with the result that the two teeth 3a of the toothed ring 3 which are the lowermost, are locked in the corresponding two adjacent troughs 1b of the notched bar 1. This results in a mutual locking of the notched bar 1 and or the toothed wheel 2 and an immobilization of the bar 1.

On the contrary, when the effort F stops being exerted on the notched bar 1 and this bar returns into a low position (FIG. 2) in which the tops of its teeth 1a lie outside the pitch circle P, the teeth 3a of the toothed ring 3 are no longer locked in the notches 1b of the notched bar 1. The toothed wheel 2 may therefore rotate freely in both directions in the direction of arrow B, "floating" around the fixed support shaft, in a substantially centered position, and the notched bar 1 may move freely in translation in the direction of arrow A.

Figure 3:
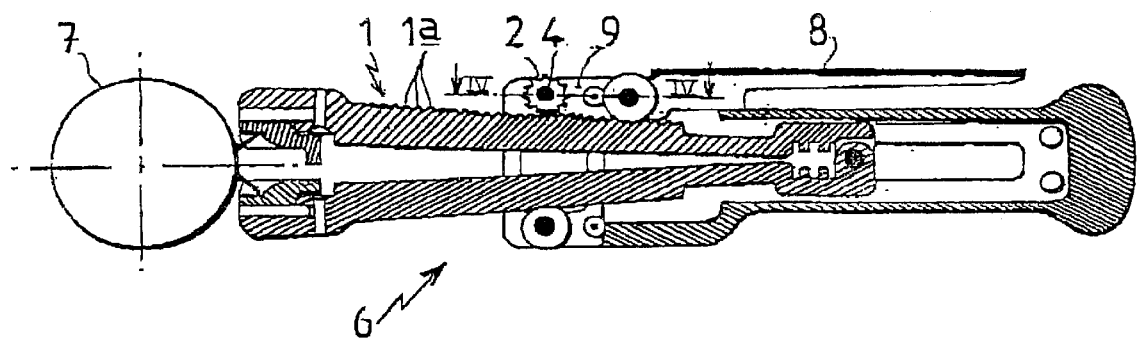
FIG. 3 is a view in section of a tool for fitting a band clamp in which the locking/unlocking device according to the invention is used.
Figure 4:
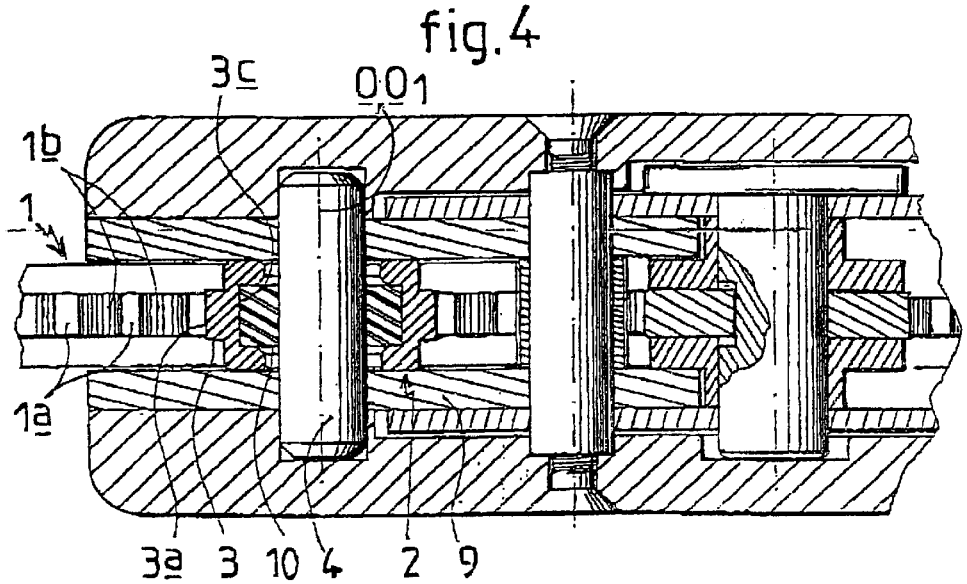
FIG. 4 is a view in section, on a larger scale, made along line IV—IV of FIG. 3.

FIGS. 3 and 4 show, by way of non-limiting illustration, an application of the invention to a tool 6 for fitting a band clamp 7. FIG. 3 shows the notched bar 1 presenting the teeth 1a on its upper face, the toothed wheel 2 being able to rotate about the fixed support shaft 4 and a trigger 8 making it possible to act on the notched bar 1 in order to disengage it from the toothed wheel 2, by placing it in the lower position shown in FIG. 2, and to allow slide of this bar 1.

FIG. 4 shows that the support shaft 4 of the toothed wheel 2 is borne by a fixed cage 9 of the fitting tool. Furthermore, in this form of embodiment, the radial clearance between the bore 3c of the toothed ring 3 and the support shaft 4 is filled with an elastic ring 10, for example made of elastomer, which is sufficiently compressible to allow the necessary transverse offset of the toothed wheel 2 with respect to the support shaft 4.

When the notched bar 1 presses on the toothed wheel 2, exerting the force F (FIG. 1), the elastic ring 10 is crushed and the situation of locking is found again.

On the contrary, as soon as the pressing of the bar 1 weakens or is cancelled, the toothed wheel 2 immediately becomes self-centered, which makes it possible to avoid the effects of "trailing" of the idle pinion at the moment of the engagements/disengagements of the teeth (vibration, noise, etc . . . ) and provides a more rapid and more precise functioning when the device is used very repetitively (locking/unlocking corresponding each time to the advance of a tooth of the toothed wheel).

According to a variant embodiment, the toothed ring 3 of the wheel 2 may be mounted on two metallic annular plates of which the bore diameter is such that it allows a sufficient compression of the elastic ring 10 to obtain mutual locking of the toothed wheel 1 and of the mobile notched member 1, while limiting the crushing of the elastic ring further to their coming into contact with the fixed support shaft 4.

Although in the foregoing description the invention has been described with reference to a notched bar 1 mobile in translation, it goes without saying that the locking/unlocking device might also be used with a pinion in place of the notched bar 1, this pinion being in mesh with the toothed wheel 2 and being able to be displaced, under the effect of the force F, towards the axis $O_1$ of the support shaft 4.

What is claimed is:

1. Device for locking/unlocking the movement of a mobile notched member comprises:

a toothed wheel in mesh, in a zone of contact, with the notches of the mobile member having a coaxial bore and of which the teeth of the toothed wheel have a pitch equal to that of the teeth of the mobile member; and a fixed support shaft about which the toothed wheel is mounted to rotate, said fixed support shaft having an outer diameter smaller than the inner diameter of the bore of the wheel such that, subsequent to the radial clearance thus formed, the wheel may move radially between a substantially centered position of unlocking in which the tops of the teeth of the notched mobile member which are the closest to the wheel, are located outside a pitch circle P of the teeth of the wheel and the notched mobile member may in that case move freely, and an off-center position of locking, when the notched mobile member exerts on the toothed wheel a force F directed towards the axis of the fixed support shaft, in which the top of a tooth of the notched mobile member is located, between two teeth of the toothed wheel, within the pitch circle P of the teeth of the wheel, such that the notched mobile member and the toothed wheel are locked mutually.

2. Device according to claim 1, wherein the radial clearance formed between the inner surface of the bore of the toothed wheel and the outer surface of the fixed support shaft is left empty.

3. Device according to claim 1, wherein a ring of elastic material is disposed between the inner surface of the bore and the outer surface of the fixed support shaft.

4. Device according to claim 3, wherein the wheel comprises a toothed ring mounted on two metallic annular plates of which the bore diameter is such that it allows a sufficient compression of the elastic ring to obtain the mutual locking of the toothed wheel and of the mobile notched member, while limiting the crushing of the elastic ring further to their coming into contact with the fixed support shaft.

* * * * *